E. S. STOWERS AND J. W. SCOTT.
TRANSMISSION MECHANISM.
APPLICATION FILED MAR. 27, 1920.
1,403,819.
Patented Jan. 17, 1922.
3 SHEETS—SHEET 1.
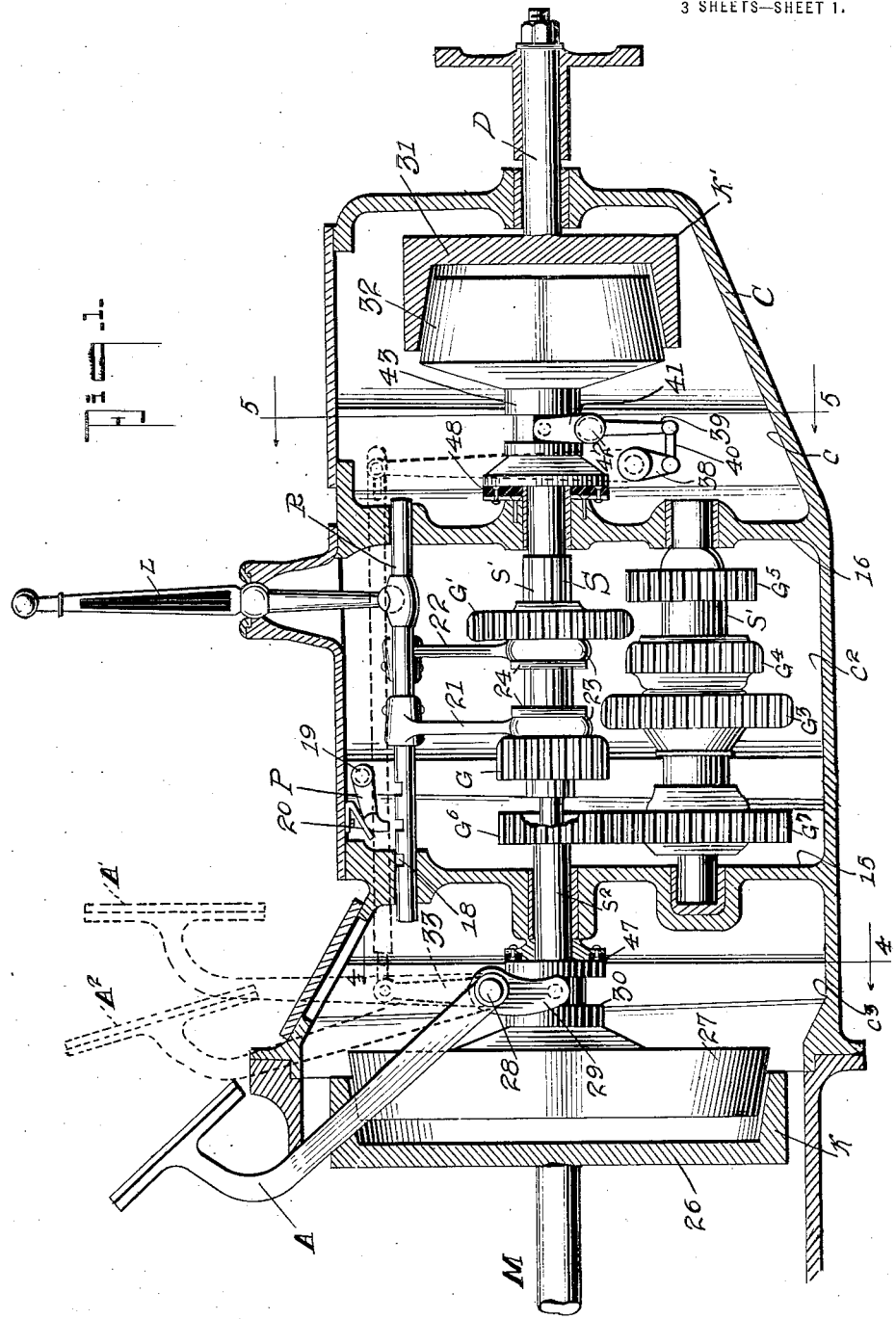
WITNESSES
INVENTOR
Eugene S. Stowers.
John W. Scott.
BY
ATTORNEYS

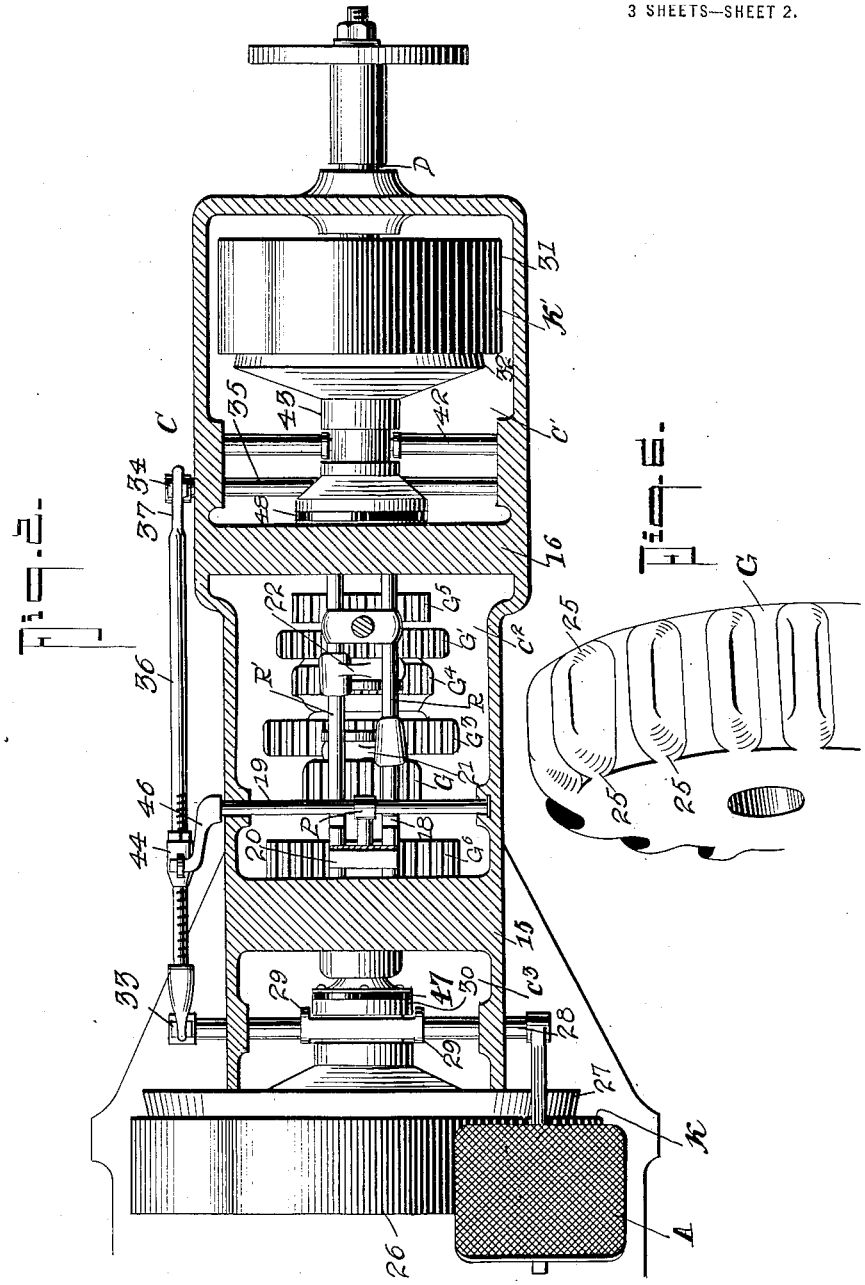

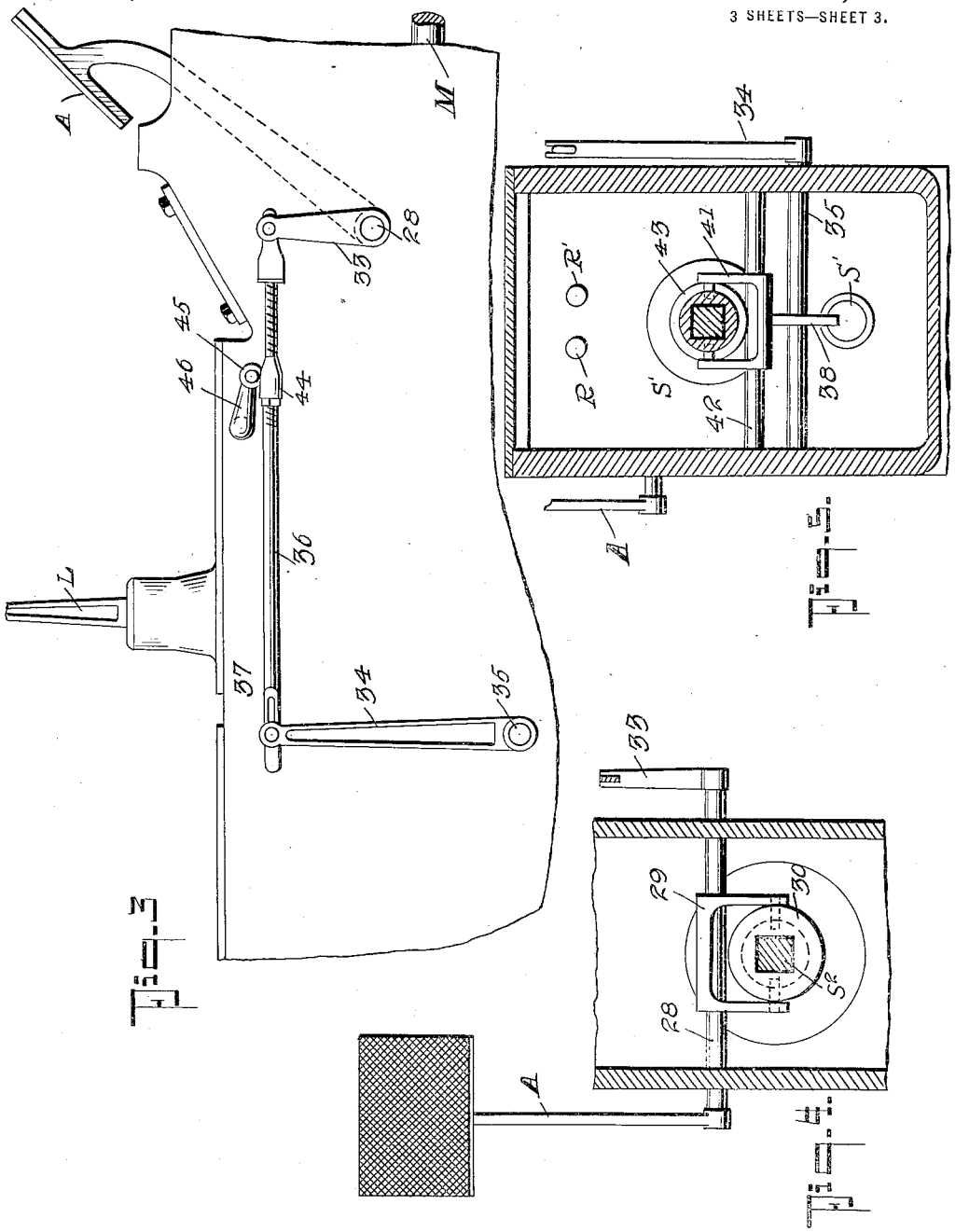

UNITED STATES PATENT OFFICE.

EUGENE SEWELL STOWERS AND JOHN WILLIAM SCOTT, OF BRAMWELL, WEST VIRGINIA.

TRANSMISSION MECHANISM.

1,403,819.  Specification of Letters Patent.  Patented Jan. 17, 1922.

Application filed March 27, 1920. Serial No. 369,376.

*To all whom it may concern:*

Be it known that we, EUGENE SEWELL STOWERS and JOHN WILLIAM SCOTT, both of Bramwell, in the county of Mercer and State of West Virginia, have invented certain new and useful Improvements in Transmission Mechanism, of which the following is a specification.

Our invention relates generally to transmission mechanisms for motor vehicles and particularly to mechanisms of the character having means whereby the transmission gearing is temporarily disconnected from the driven and driving mechanisms during the interval when the speed changing mechanism is being operated thereby preventing breakage by the accidental engagement of rapidly moving parts.

In all transmission mechanisms of this character with which we are familiar, no means has been provided for the accidental or unskilled shifting of the gears of the speed changing mechanism so that such gears can be shifted at any period for operating the elements without temporarily disconnecting such mechanism from the driving and driven mechanisms. This obviously permits the engagement of the rapidly moving gears which are rotated at different speeds, thereby causing injury to the gears as in the ordinary transmission. Further, it has been found that no means is provided for positively stopping the rotation of the gears during the process of gear changing so that in order to effectively shift the gears without detriment to the same it is necessary to delay the shifting operation until the transmission gears of their own accord come to a full stop, which, in the meantime, the momentum of the driven mechansm will be checked to such an extent as to make the gear changing operation extremely difficult.

The purpose of our invention is to provide a transmission mechanism which eliminates those objectionable features by providing locking means which renders the shifting of the gears impossible except when the speed changing mechanism is disconnected from the driving and driven mechanisms and brakes which are automatically operable to bring the gears to a dead stop as soon as the speed changing mechanism is disconnected from the driving and driven mechanisms.

We will describe one form of transmission mechanism embodying our invention, and will then point out the novel features thereof in claims.

In the accompanying drawings:

Figure 1 is a view showing in vertical longitudinal section and partly in elevation, one form of transmission mechanism embodying our invention.

Figure 2 is a horizontal longitudinal sectional view of the mechanism shown in Figure 1.

Figure 3 is a view showing in side elevation a portion of the casing for the mechanism shown in the preceding views.

Figure 4 is a vertical sectional view taken on the line 4—4 of Figure 1.

Figure 5 is a view similar to Figure 4 taken on the line 5—5 of Figure 1.

Figure 6 is an enlarged detail view of one of the gears used in the speed changing mechanism shown in Figures 1 and 2.

Similar reference characters refer to similar parts in each of the several views.

Referring specifically to the drawings and particularly to Figures 1 and 2, C designates generally the casing for the transmission mechanism which is divided by means of partitions 15 and 16 into three separate and distinct compartments designated at $c$, $c^2$ and $c^3$. In the compartment $c^2$ is arranged the speed changing mechanism which, in the present instance, comprises a main shaft S and a counter shaft S', such shafts being journaled in suitable bearings formed in the partitions 15 and 16 as clearly shown in Figure 1. The main shaft S is made up of two shaft sections $s'$ and $s^2$, the long shaft section $s'$ being movable longitudinally through the partition 16 and having its forward end rotatably fitted within a suitable socket formed in the rear end of the short shaft section $s^2$ so that such section can rotate independently of the other section. The shaft section $s'$ carries gears G and G' which are mounted for rotation with the shaft and are slidable longitudinally thereon by means of ribs 17 which fit in suitable recesses formed in the hubs of such gears. The gears G and G' are adapted to be shifted longitudinally in one direction or the other to effect the meshing and unmeshing thereof with gears $G^3$, $G^4$ and $G^5$ fixed to the counter shaft S' and of different diameters so as to secure a variance in speed of the shaft S, as will be understood. The short shaft section $s^2$ carries at its rear end a gear $G^6$ which constantly meshes with a gear $G^7$ fixed to the counter shaft S' so that a driving connection between the two is at all times maintained.

The shifting of the gears G and G' to secure the different speeds is effected through the medium of a lever L, which as shown in Figure 1 is mounted for universal movement upon the casing C and is universally connected at its lower end to a pair of rods R and R'. The rods R and R' are mounted for longitudinal sliding movement within suitable openings formed in the partitions 15 and 16, and are provided adjacent their forward ends with notches 18 which are adapted to receive a locking pawl P carried by a shaft 19 journaled in the casing C as clearly shown in Figure 2. The pawl P is normally biased toward the rods R and R' by means of a spring 20 so that when the shaft 19 is free to rotate, the pawl will bear against the rod so as to engage corresponding notches. The rods R and R' have fixed thereto arms 21 and 22 which are formed at the free ends with forks 23 that embrace grooved collars 24 formed on the hubs of the gears G and G'. By this arrangement, the rods R and R' when shifted longitudinally in one direction or the other by means of the lever L effects a shifting of the gears G and G' so as to engage or disengage the gears carried by the counter shaft S'.

The gears G, G' and $G^3$ are formed in the manner shown in Figure 6 wherein it will be noted that the opposite ends of each tooth is beveled as indicated at 25. The purpose of this construction is to insure the meshing of the teeth of one gear with the teeth of another gear irrespective of the position of the teeth of the gears at the time they are shifted laterally into meshing relation with each other. It will be understood that because of the beveled ends, the beveled surfaces of any two alined teeth will coact with each other when the shifting of one of the gears is effected to guide the teeth into the spaces between the teeth, and to thereby insure the intermeshing of the gears. As shown in Figure 1, the teeth of the gear $G^4$ have only one of their ends beveled, it being unnecessary to bevel both ends as will be understood.

As shown in Figure 1, the short shaft section $s^2$ extends through and to the forward side of the partition 15 where it is adapted to be operatively connected to a motor shaft M through the medium of a clutch K. The clutch K is of conventional form comprising a conical socket 26 fixed to the adjacent end of the motor shaft M, and a conical head 27 slidably mounted upon the forward end of the shaft section $s^2$. As illustrated to advantage in Figure 4, the forward end of the section $s^2$ is squared and fits within a squared bore formed in the head 27 so that while being capable of longitudinal sliding movement upon the shaft section to engage or disengage the socket 26, the head 27 is at all times rotatable with the shaft section. The longitudinal shifting of the head 27 is effected through the medium of a clutch pedal A which is fixed to one end of a shaft 28 journaled in the casing C and provided with a fork 29 that engages a collar 30 formed on the hub of the head 27, as clearly shown in Figure 4.

The rear end of the shaft section $s'$ is adapted to be operatively connected to a driven shaft D through the medium of a clutch K' which is similar in construction to the clutch K and comprises a socket 31 fixed to the shaft D, and a head 32 slidably mounted upon the shaft section S' but rotatable therewith in a manner similar to the head 27. The head 32 is moved into and out of engagement with the socket 31 by means of the pedal A, such pedal being operatively connected to the head through the medium of an arm 33 fixed to the shaft 28 and operatively connected to an arm 34 fixed to a shaft 35 through a rod 36, as clearly shown in Figure 3. The rod 36 and the arm 34 are connected by a pin and slot connection as indicated at 37 in Figure 3 for a purpose which will be hereinafter described. The shaft 35 is journaled within the casing C in the manner shown in Figures 2 and 5 and is provided at a point intermediate its ends with an arm 38 which is operatively connected to an arm 39 by means of a link 40. The arm 39 is formed integral with a fork 41 and the latter is rotatably mounted upon a shaft 42 journaled in the casing C. The fork 41 embraces a grooved collar 43 fixed to the hub of the head 32 so that when the fork is rocked in one direction or the other a longitudinal shifting of the collar and consequently the head, is effected to cause the latter to engage or disengage the socket 31.

By the foregoing arrangement it will be seen that when the shaft 28 is rotated through the medium of the pedal A, a similar movement is imparted to the shaft 35, which latter in turn effects a rocking of the fork 41 to move the head 32 into and out of engagement with the socket 31. The pawl P is adapted to be moved to disengaging position against the tension of the spring 20 simultaneously with the rearward movement of the rod 36, and to this end the rod 36 is provided with an adjustable collar 44 that carries a pivot ear 45 to which is connected an arm 46 formed on one end of the shaft 19.

As clearly shown in Figures 1 and 2, the partitions 15 and 16 have secured thereto abrasive elements 47 and 48 which surround the main shaft S and are disposed in confronting relation to the collars 30 and 43 so that when the heads 27 and 32 of the clutches K and K' are in disengaging position as shown in Figure 1, such collars will contact with the abrasive elements. As the abrasive elements are stationary, it is obvious that when the collars are contacting therewith they will serve to prevent rotation of the collars and thus bring the heads 27 and 32 to rest. As the collars are fixed to the shaft S for rotation therewith, it will be manifest that when the abrasive elements engage the collars, the latter will also serve to prevent rotation of the shaft S, and because the shaft S is operatively connected at all times to the counter shaft S', it will be clear that the abrasive elements serve to also prevent rotation of the counter shaft S' so that all of the gears of the speed changing device are brought to rest.

The operation of the entire mechanism is as follows:

In the normal position of the transmission mechanism, the heads 27 and 32 are in the active position so that the shaft M is operatively connected to the shaft S, while the latter is operatively connected to the driven shaft D. In this position of the clutches K and K', the pedal A occupies the position indicated in dash lines in Figure 1 and designated by the reference character A'. With the motor shaft M rotating and all of the gears of the speed changing mechanism in neutral position, the shaft D is at rest so that the motor of the vehicle does not effect its propulsion. In order to effect a driving of the shaft D, the pedal A is moved from the position indicated by the character A' to the position shown in solid lines in Figure 1, this movement of the pedal being the full length of its throw. With this movement of the pedal, the heads 27 and 32 are moved to disengaging positions, while simultaneously therewith, the rod 36 is moved forwardly to cause the pawl P to be elevated out of the notches 18 of the rods R and R'. As the pawl P now disengages the rods, it is obvious that the latter are free to be moved longitudinally through the manipulation of the lever L, and to thereby effect a shifting of the gears G and G'. Simultaneously with the movement of the heads 27 and 32 to disengaging positions, the collars 30 and 43 are moved into engagement with the abrasive elements 47 and 48 thereby bringing the gears of the speed changing mechanism to rest so that the shifting of the gears G and G' can be readily effected to secure the desired change in speed. As previously stated, it is immaterial as to what positions the gears occupy with respect to each other when they are brought to rest as the intermeshing of the same can be readily effected because of the beveled ends of the gear teeth. As the gears are all at rest, it is obvious that the shifting of the same to obtain the desired ratio can be effected without danger of breakage, and without undue wear or noise.

As soon as the gear shifting operation has been completed, the pedal A is released so that it moves back to its normal position, and with such movement the clutches K and K' are moved to active position thereby operatively connecting the several shafts so that power is transmitted from the motor shaft M to the driven shaft D. It is to be particularly noted that movement of the clutch K into inactive position occurs when the pedal is moved from position A' to the position indicated by the character $A^2$, but because of the pin and slot connection 37, movement of the clutch K' into inactive position does occur only when the pedal is moved to the final position shown in solid lines. This delayed movement of the clutch K' allows the driven mechanism to stop without operating the clutch K' or the pawl P, thus eliminating unnecessary wear of the clutch and the pawl while at the same time permitting the use of the clutch K to control the various speeds of the mechanism without the necessity of shifting gears. Simultaneously with the return of the pedal A to its normal position, the pawl P is released so that its spring returns the same into one of the notches 18 of the rods R and R', thereby effecting a locking of the rods and consequently the gears G and G' against longitudinal movement upon the shaft S.

Although we have herein shown and described only one form of transmission mechanism embodying our invention, it is to be understood that various changes and modifications may be made herein without departing from the spirit of the invention and the spirit and scope of the appended claims.

What we claim is:

1. A transmission mechanism comprising, a driving shaft, a driven shaft, a speed changing mechanism comprising, a main shaft, a counter shaft, gears on said shafts, gear shifting means, clutches for operatively connecting the driving shaft with the main shaft and the counter shaft with the driven shaft, braking means associated with said clutches to stop rotation of the main shaft and the counter shaft when said clutches occupy non-connecting positions, means for successively actuating the clutches, and means controllable by the clutch actuating means for releasing or locking the gear shifting means according as the main shaft is connected or disconnected from the driving and driven shafts.

2. A transmission mechanism comprising, a driving shaft, a driven shaft, speed changing mechanism including, a main shaft and a counter shaft, gears carried by said shafts, certain of which are shiftable, means for shifting the shiftable gears comprising a lever, and notched rods operatively connected to the lever and to the shiftable gears, a pair of clutches for operatively connecting the driving shaft and driven shaft with the main shaft, clutch actuating shafts, a pedal connected to one of the shafts, a rod operatively connecting the clutch actuating shafts, one end of said rod having a pin and slot connection with one of the clutch actuating shafts to effect a delayed movement of the corresponding clutch when said pedal is actuated, a spring pressed pawl engageable with the notches of said rods for locking the latter against movement, and adjustable means operatively connecting said pawl and rod.

3. A transmission mechanism comprising, a driving shaft, a driven shaft, speed changing mechanism including, a main shaft and a counter shaft, gears carried by said shafts, certain of which are shiftable, means for shifting the shiftable gears comprising, a lever, and notched rods operatively connected to the lever and to the shiftable gears, a pair of clutches for operatively connecting the driving shaft and driven shaft with the main shaft, clutch actuating shafts, a pedal connected to one of the shafts, a rod operatively connecting the clutch actuating shafts, one end of said rod having a pin and slot connection with one of the clutch actuating shafts to effect a delayed movement of the corresponding clutch when said pedal is actuated, a spring pressed pawl engageable with the notches of said rods for locking the latter against movement, a shaft for movably supporting the pawl, a crank on one end of the shaft, and a collar adjustable on said rod and operatively connected to said crank.

4. A transmission mechanism comprising, a casing, partitions within the casing arranged to divide the casing into compartments, a driving shaft, a driven shaft, speed changing mechanism including, a main shaft journaled in the partitions and comprising sections, gears carried by the sections of said shaft, certain of said gears being shiftable, a pair of clutches within the casing for operatively connecting the sections of the main shaft with the driving and driven shafts, said clutches including collars rotatable with the heads of the clutches, abrasive elements secured to the partitions and adapted to be engaged by said collars to prevent rotation of the clutch heads when the latter are in inactive position, means for successively actuating the clutches, locking means for said gear shifting means, and means operable by said actuating means for controlling said locking means.

EUGENE SEWELL STOWERS.
JOHN WILLIAM SCOTT.